(12) United States Patent
Liu

(10) Patent No.: US 8,746,637 B2
(45) Date of Patent: Jun. 10, 2014

(54) FOLDABLE FRAME

(76) Inventor: Chun-Sheng Liu, Dongshan Township, Yilan County (TW)

( * ) Notice: Subject to any disclaimer, the term of this patent is extended or adjusted under 35 U.S.C. 154(b) by 137 days.

(21) Appl. No.: 12/703,831

(22) Filed: Feb. 11, 2010

(65) Prior Publication Data

US 2011/0192942 A1 Aug. 11, 2011

(51) Int. Cl.
*F16M 11/38* (2006.01)
*F16M 11/32* (2006.01)
*E04H 15/46* (2006.01)
*E04H 15/48* (2006.01)
*A47B 1/00* (2006.01)

(52) U.S. Cl.
USPC ............ 248/166; 248/188.6; 248/439; 5/627; 135/139; 135/143

(58) Field of Classification Search
USPC ........... 248/166, 165, 460, 188.6, 188.5, 440, 248/439; 135/40, 74, 98, 75, 143–147; 5/627; 280/287; 297/16.1
See application file for complete search history.

(56) References Cited

U.S. PATENT DOCUMENTS

| | | | | |
|---|---|---|---|---|
| 1,449,894 A * | 3/1923 | Dial | ................................ | 135/98 |
| 2,723,673 A * | 11/1955 | Call | ............................... | 135/140 |
| 5,249,541 A * | 10/1993 | Sato et al. | ...................... | 112/316 |
| 7,066,438 B2 * | 6/2006 | Ma | ................................. | 248/166 |
| 2009/0184073 A1 * | 7/2009 | Lu | ................................. | 211/85.3 |

* cited by examiner

Primary Examiner — Tan Le

(57) ABSTRACT

A foldable frame includes two tubes, a rectangular tube and two base parts. The two tubes are pivotably or fixedly connected to the base parts. Two ends of the rectangular tube are connected to two respective extension portions of the two base parts by two pins, so that the two tubes are pivotable about the two pins. The frame can also be structured as one tube directly connected to the rectangular tube, and the other tube is pivotably connected to the base part. The extension of the base part is pivotably connected of the rectangular tube by a pin to form a single-point folding feature. An outer tube is rotatably movable between one of the tubes and the rectangular tube, and the outer tube hides the rectangular tube when the two tubes are arranged linearly.

20 Claims, 18 Drawing Sheets

US 8,746,637 B2

FOLDABLE FRAME

FIELD OF THE INVENTION

The present invention relates to a frame and, more particularly, to a foldable frame which can be folded easily.

BACKGROUND OF THE INVENTION

A conventional stretcher, recliner or even desk may include folding mechanisms in order to fold the article to a small size which is convenient for transportation and storage purposes. There are some shortcomings for the conventional foldable articles. The first one is that the conventional folding mechanism is composed of multiple tubes of different diameters, so that the smaller tubes can be received in the tubes of larger diameters to form the folded status. However, before the tubes are organized and connected to each other, they occupy space, and one of the tubes can be easily lost. Once one tube is lost, the rest of the tubes cannot be connected to each other. The second shortcoming is that there is a lack of a pivoting mechanism to further reduce the space that the folded status occupies. Even if there is a pivoting mechanism available, the conventional pivoting mechanism includes a complicated structure.

The present invention provides a foldable frame including at least one single-point folding unit and at least one two-point folding unit, and an outer tube is used to hide the folding unit when the two tubes are aligned to each other.

SUMMARY OF THE INVENTION

The present invention relates to a foldable frame and includes two tubes, a rectangular tube and two base parts. The two tubes are pivotably or fixedly connected to the base parts. Two ends of the rectangular tube are connected to two respective extension portions of the two base parts by two pins, so that the two tubes are pivotable about the two pins. The frame can also be structured as one tube directly connected to the rectangular tube, and the other tube is pivotably connected to the base part. The extension portion of the base part is pivotably connected to the rectangular tube by a pin to form a single-point folding feature. An outer tube is rotatably movable between one of the tubes and the rectangular tube, and the outer tube hides the rectangular tube when the two tubes are arranged linearly. The foldable frame can be used for stretchers, recliners, foldable bicycles, crutches, or desks.

The present invention will become more obvious from the following description when taken in connection with the accompanying drawings which show, for purposes of illustration only, preferred embodiments in accordance with the present invention.

BRIEF DESCRIPTION OF THE DRAWINGS

FIG. 6 shows the stretcher that the foldable frame of the present invention is applied to;

FIG. 8 shows the recliner that the foldable frame of the present invention is applied to;

FIG. 10 shows the desk that the foldable frame of the present invention is applied to;

FIG. 12 shows the bicycle that the foldable frame of the present invention is applied to;

FIG. 14 shows the crutch that the foldable frame of the present invention is applied to;

DETAILED DESCRIPTION OF THE PREFERRED EMBODIMENTS

Figure 1:
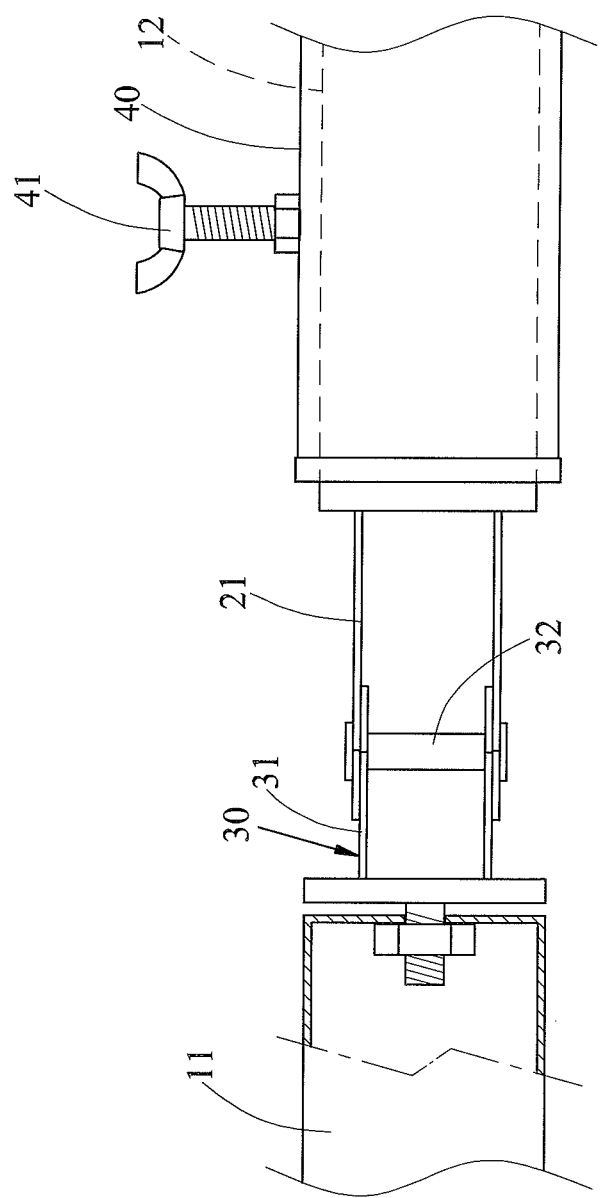
FIG. 1 is a partly cross sectional view showing the first embodiment of the foldable frame of the present invention.
Figure 2:
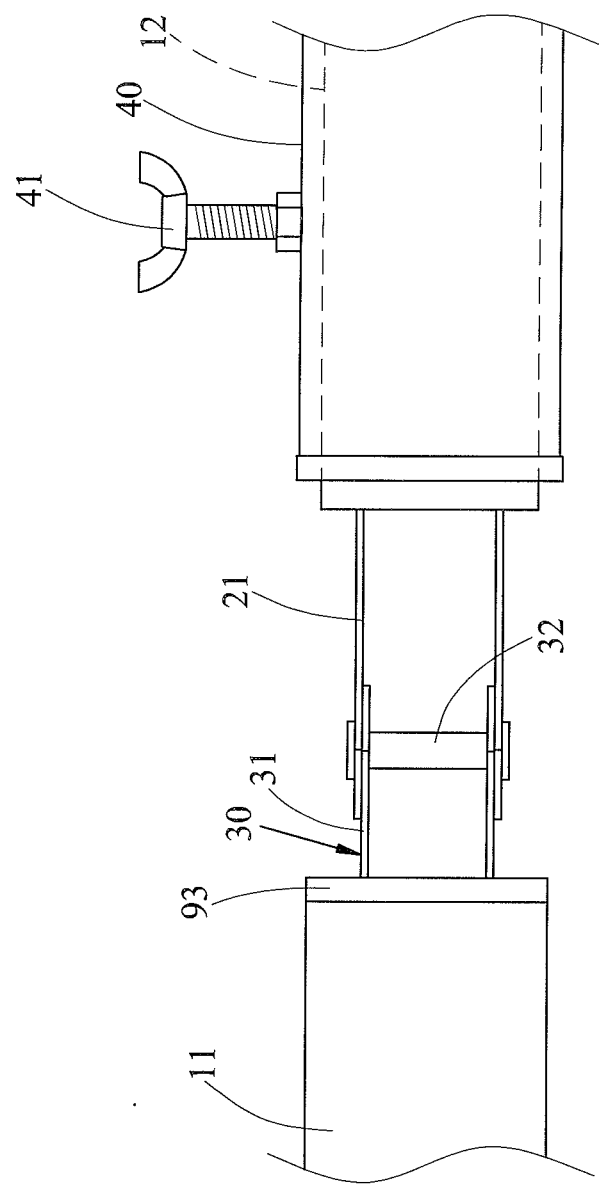
FIG. 2 is a plane view showing the first embodiment of the foldable frame of the present invention.

Referring to FIGS. 1 and 2, the foldable frame of the present invention comprises a first tube 11, a second tube 12, a rectangular tube 21 and at least one base part 30. The second tube 12 is connected to a first end of the rectangular tube 21, and a second end of the rectangular tube 21 is pivotably connected to an extension portion 31 of the at least one base part 30 by a pin 32. Therefore, the first tube 11 is pivotable about the pin 32 to form the single-point folding unit 50. An outer tube 40 is movable between the second tube 12 and the rectangular tube 21, and a securing bolt 41 secures the outer tube 40 when the outer tube 40 is moved to a desired position.

Figure 3:
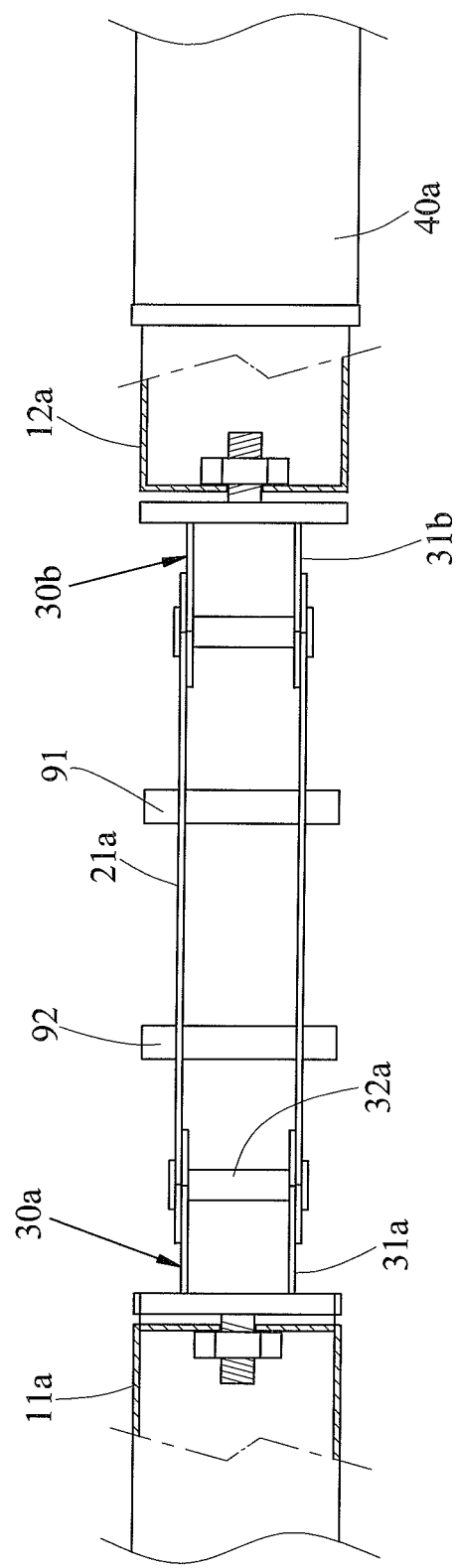
FIG. 3 is a partly cross sectional view showing the second embodiment of the foldable frame of the present invention.
Figure 4:
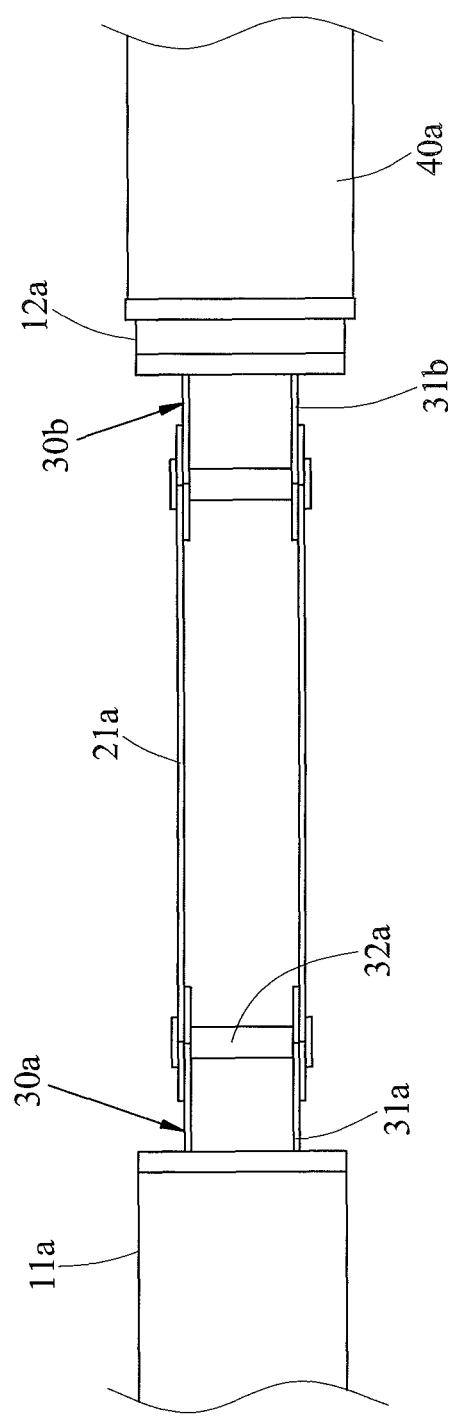
FIG. 4 is a plane view showing the second embodiment of the foldable frame of the present invention.

FIGS. 3 and 4 show the two-point folding unit 60 of the present invention including a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to form the two-point folding unit 60. An outer tube 40a is movable between the second tube 12a and the rectangular tube 21a, and an inner diameter of the outer tube 40a is the same length as the length of the two rods 91, 92 connected to the rectangular tube 21a vertically. The outer tube 40a can be connected to the first and second tubes 11a, 12a and is reinforced when connected between the first and second tubes 11a, 12a. The rectangular tube 21a is rotatable to change the folding direction.

Figure 5:
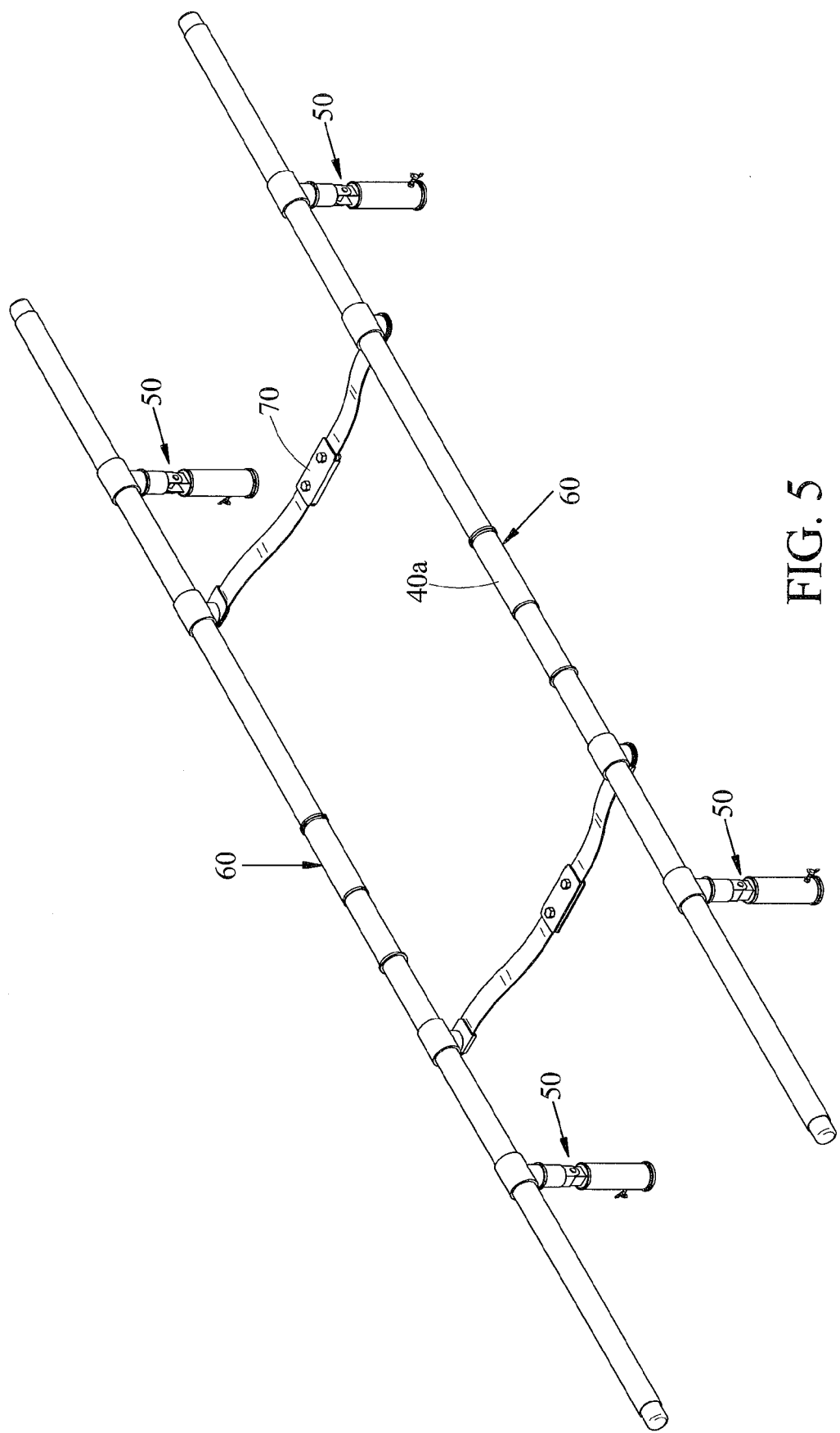
FIG. 5 shows the foldable frame of the present invention applied to the frame of a stretcher.
Figure 6:
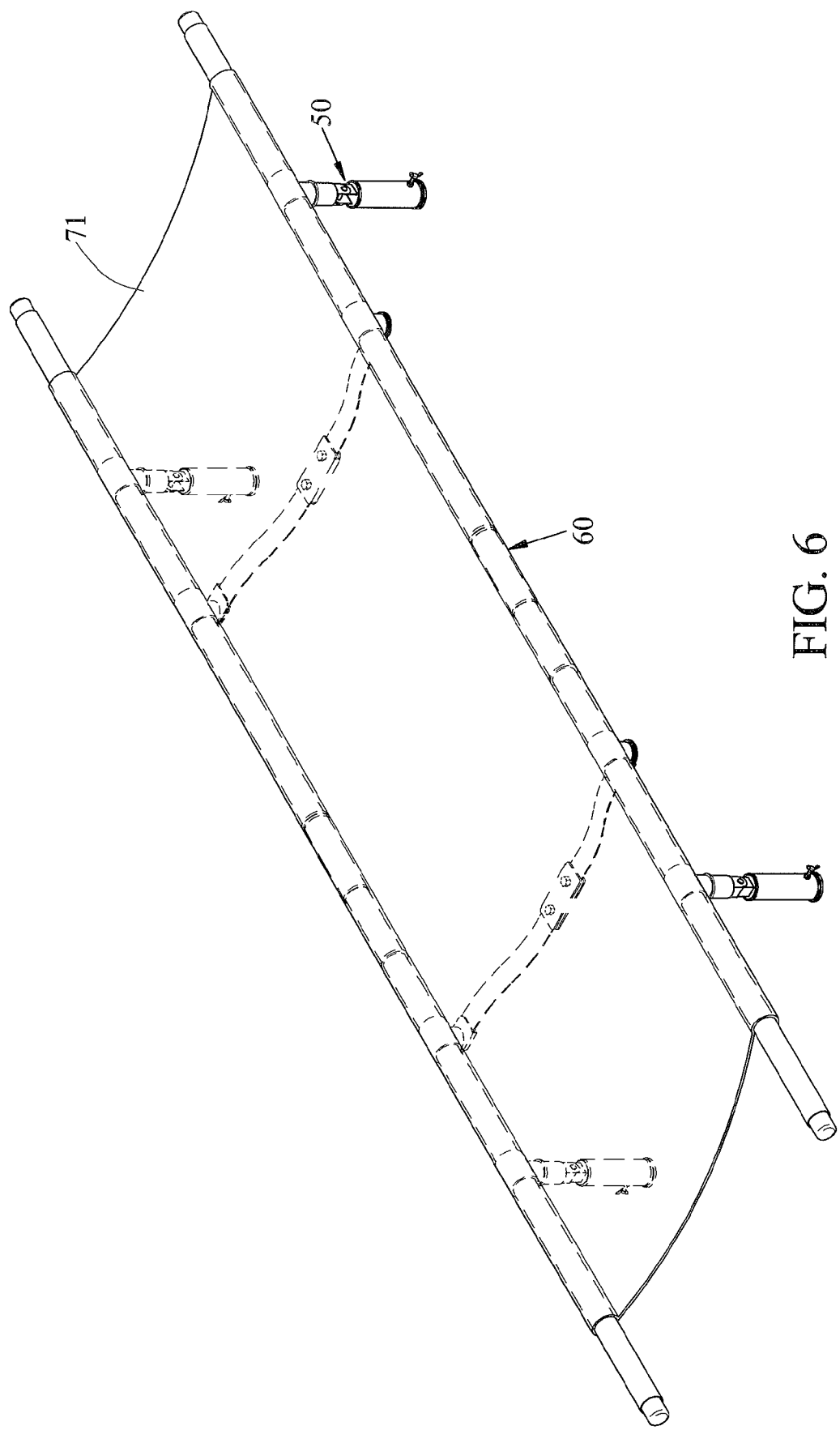
Figure 7:
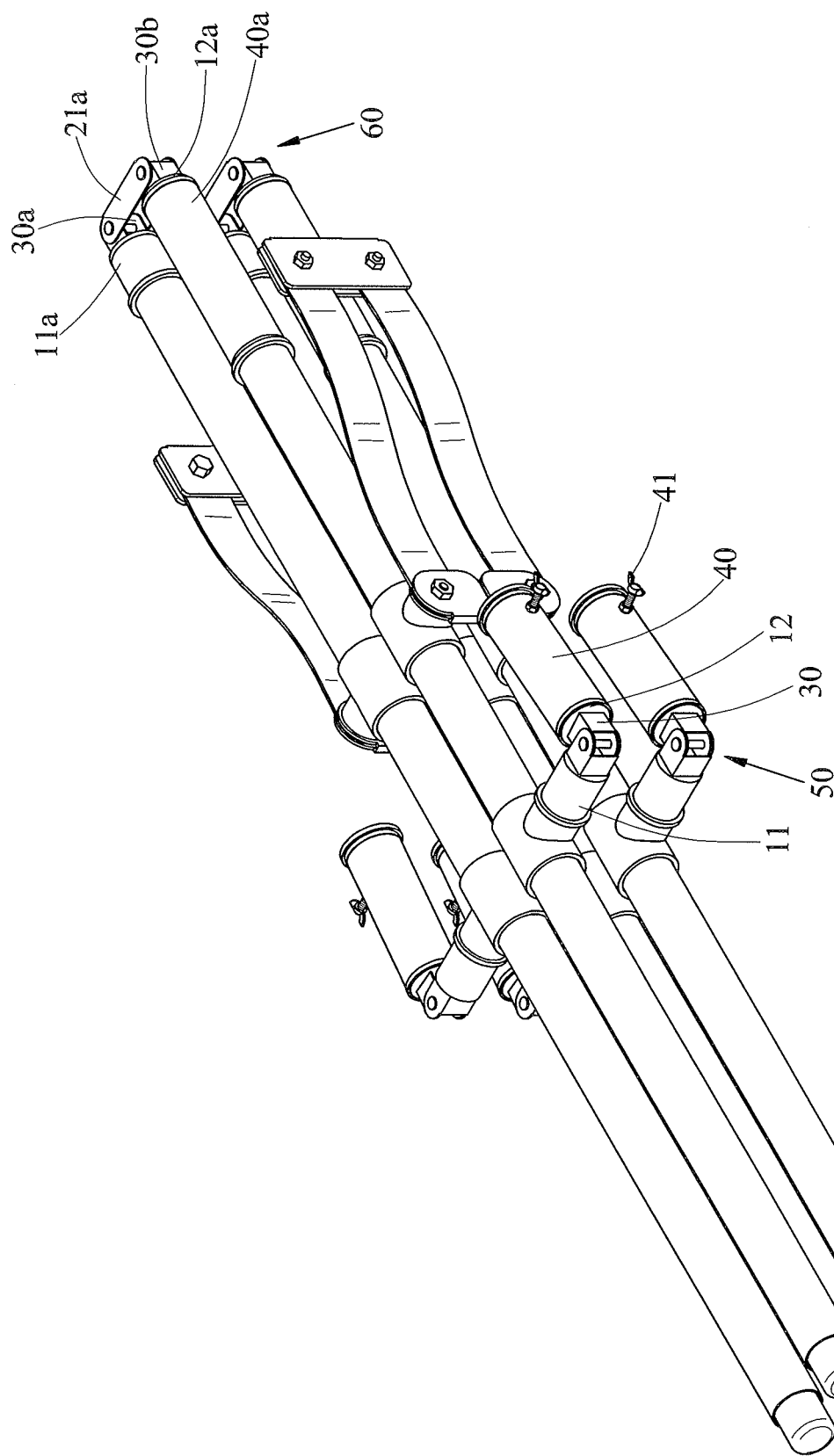
FIG. 7 shows the stretcher folded by operation of the foldable frame of the present invention.

FIGS. 5 to 7 show a stretcher which comprises two two-point folding units 60, four single-point folding units 50, two links 70 and a fabric sheet 71. The two two-point folding units 60 form the two side rails of the stretcher, and the two links 70 are connected between the two side rails. The fabric sheet 71 is mounted to the two side rails and the two links 70. The four single-point folding units 50 are connected to two respective undersides of the two side rails to function as four legs of the stretcher.

The two-point folding unit 60 includes a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to form the two-point folding unit 60. The rectangular tube 21a has two ends thereof pivotably connected to two respective extension portions 31a, 31b of the two base parts 30a, 30b by two pins 32a as shown in FIGS. 3 and 4. An outer tube 40a is movable between the second tube 12a and the rectangular tube 21a.

The single point folding unit 50, as shown in FIGS. 1 and 2, comprises a first tube 11, a second tube 12, a rectangular tube 21 and at least one base part 30. The second tube 12 is connected to a first end of the rectangular tube 21, and a second end of the rectangular tube 21 is pivotably connected to an extension portion 31 of the at least one base part 30 by a pin 32. Therefore, the first tube 11 is pivotable about the pin 32 to form the single-point folding unit 50. An outer tube 40 is movable between the second tube 12 and the rectangular tube 21, and a securing bolt 41 secures the outer tube 40 when the outer tube 40 is moved to a desired position.

Figure 8:
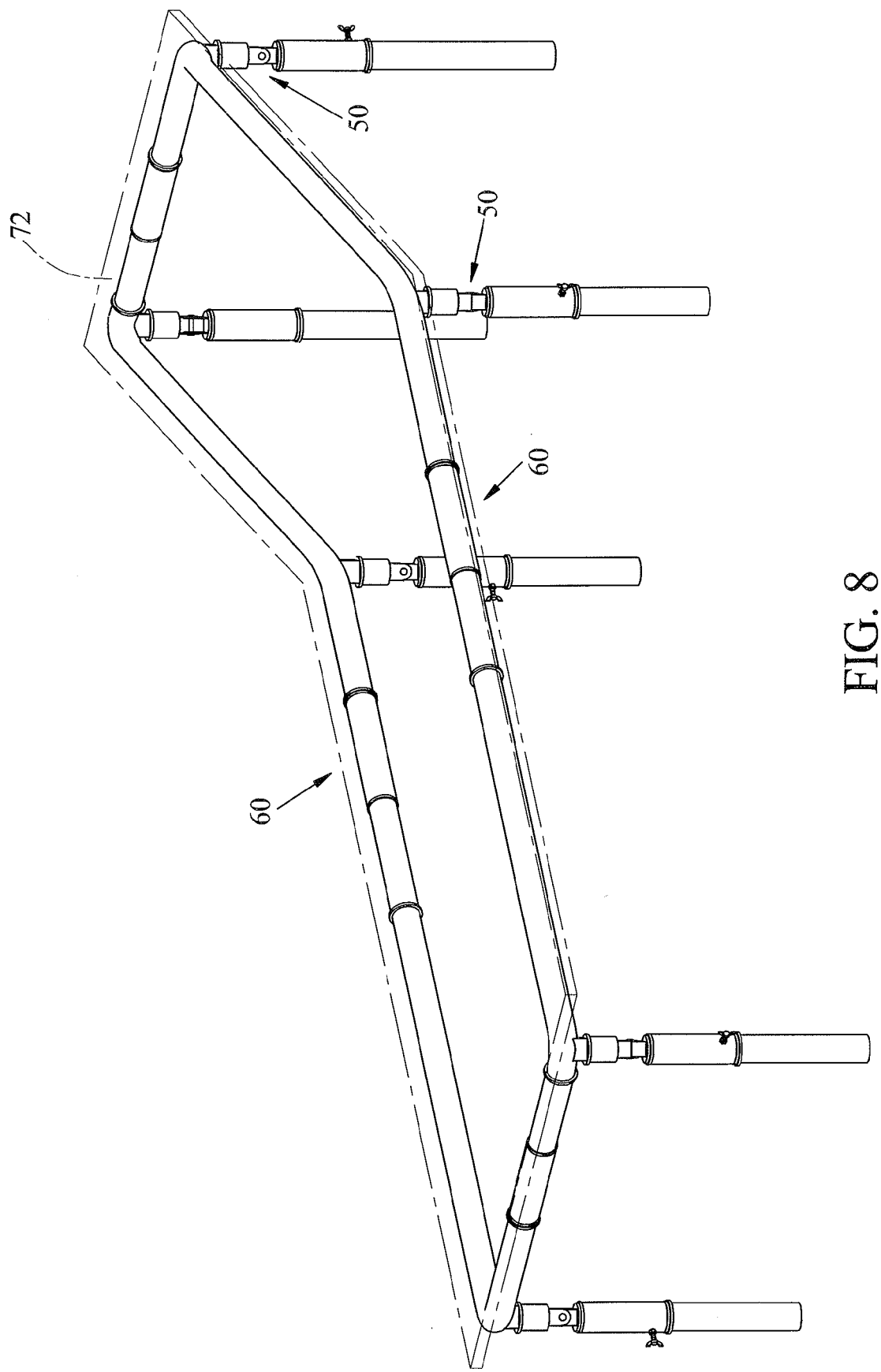
Figure 9:
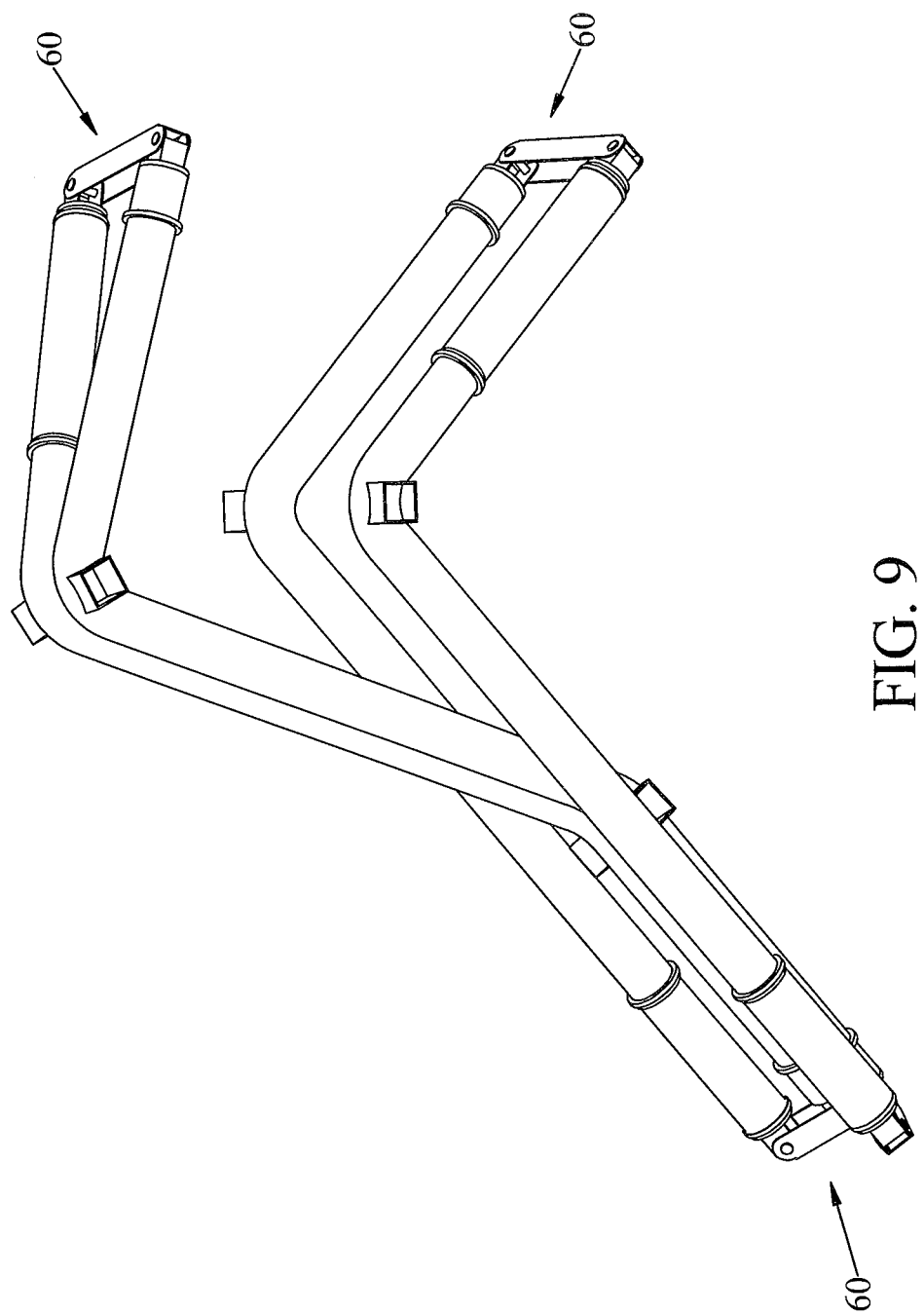
FIG. 9 shows the recliner folded by operation of the foldable frame of the present invention.

FIGS. 8 and 9 show a recliner using the foldable frame of the present invention, and the recliner comprises four two-point folding units 60, four single-point folding units 50 and a pad 72. The four two-point folding units 60 form a rectangular frame, and the pad 72 is mounted onto the rectangular frame. The four single-point folding units 50 are connected to an underside of the rectangular frame.

The two-point folding unit 60, as shown in FIGS. 3 and 4, includes a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to form the two-point folding unit 60. The rectangular tube 21a has two ends thereof pivotably connected to two respective extension portions 31a, 31b of the two base parts 30a, 30b by two pins 32a as shown in FIGS. 3 and 4. An outer tube 40a is movable between the second tube 12a and the rectangular tube 21a.

The single folding unit 50, as shown in FIGS. 1 and 2, comprises a first tube 11, a second tube 12, a rectangular tube 21 and at least one base part 30. The second tube 12 is connected to a first end of the rectangular tube 21, and a second end of the rectangular tube 21 is pivotably connected to an extension portion 31 of the at least one base part 30 by a pin 32. Therefore, the first tube 11 is pivotable about the pin 32 to form the single-point folding unit 50. An outer tube 40 is movable between the second tube 12 and the rectangular tube 21, and a securing bolt 41 secures the outer tube 40 when the outer tube 40 is moved to a desired position.

Figure 10:
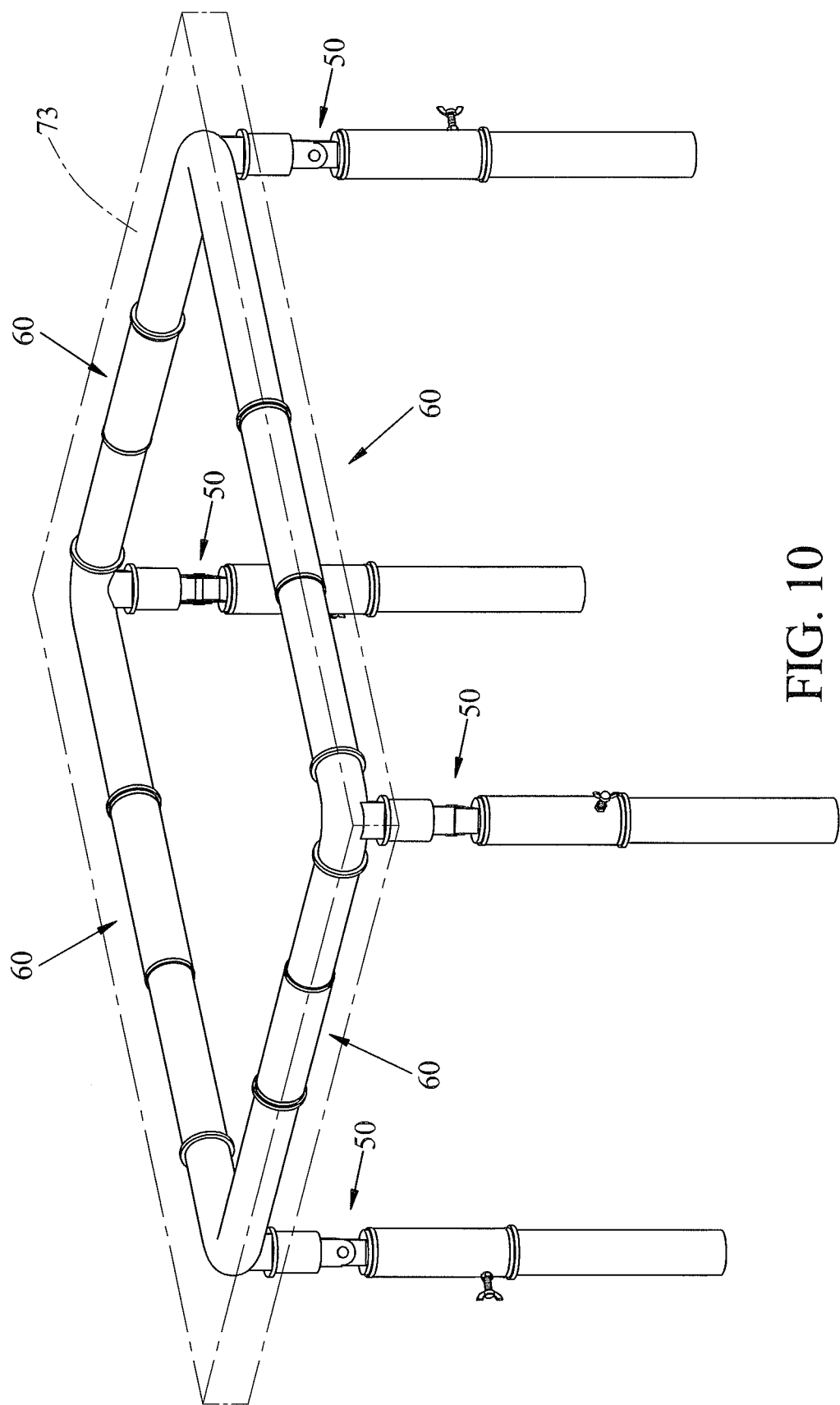
Figure 11:
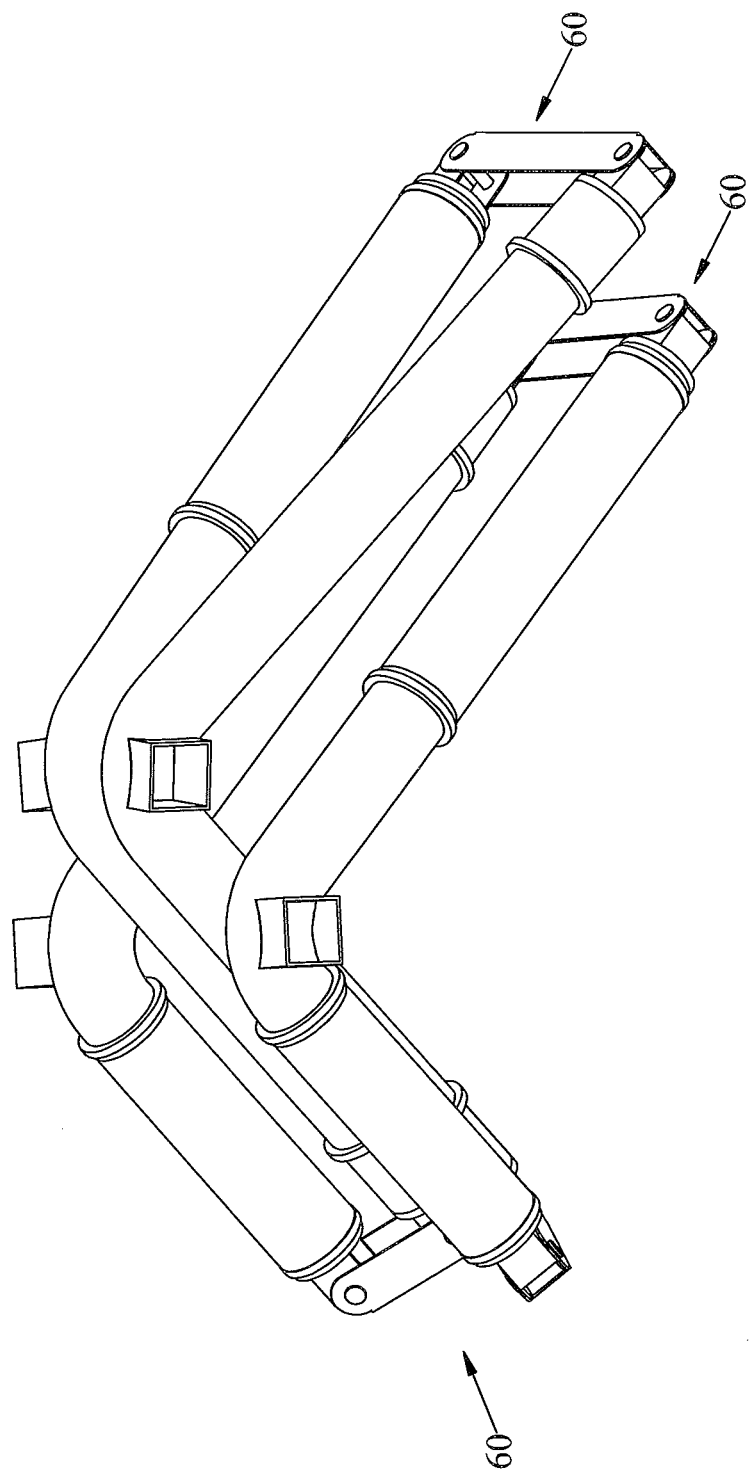
FIG. 11 shows the desk folded by operation of the foldable frame of the present invention.

FIGS. 10 and 11 show the desk using the foldable frame of the present invention and comprises at least four two-point folding units 60, at least four single-point folding units 50 and a desk top 73. The at least four two-point folding units 60 form a rectangular frame, and the desk top 73 is mounted onto the rectangular frame. The at least four single-point folding units 50 are connected to an underside of the rectangular frame to form the four legs of the desk.

The two-point folding unit 60, as shown in FIGS. 3 and 4, includes a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to form the two-point folding unit 60. The rectangular tube 21a has two ends thereof pivotably connected to two respective extension portions 31a, 31b of the two base parts 30a, 30b by two pins 32a as shown in FIGS. 3 and 4. An outer tube 40a is movable between the second tube 12a and the rectangular tube 21a.

The single folding unit 50, as shown in FIGS. 1 and 2, comprises a first tube 11, a second tube 12, a rectangular tube 21 and at least one base part 30. The second tube 12 is connected to a first end of the rectangular tube 21, and a second end of the rectangular tube 21 is pivotably connected to an extension portion 31 of the at least one base part 30 by a pin 32. Therefore, the first tube 11 is pivotable about the pin 32 to form the single-point folding unit 50. An outer tube 40 is movable between the second tube 12 and the rectangular tube 21, and a securing bolt 41 secures the outer tube 40 when the outer tube 40 is moved to a desired position.

Figure 12:
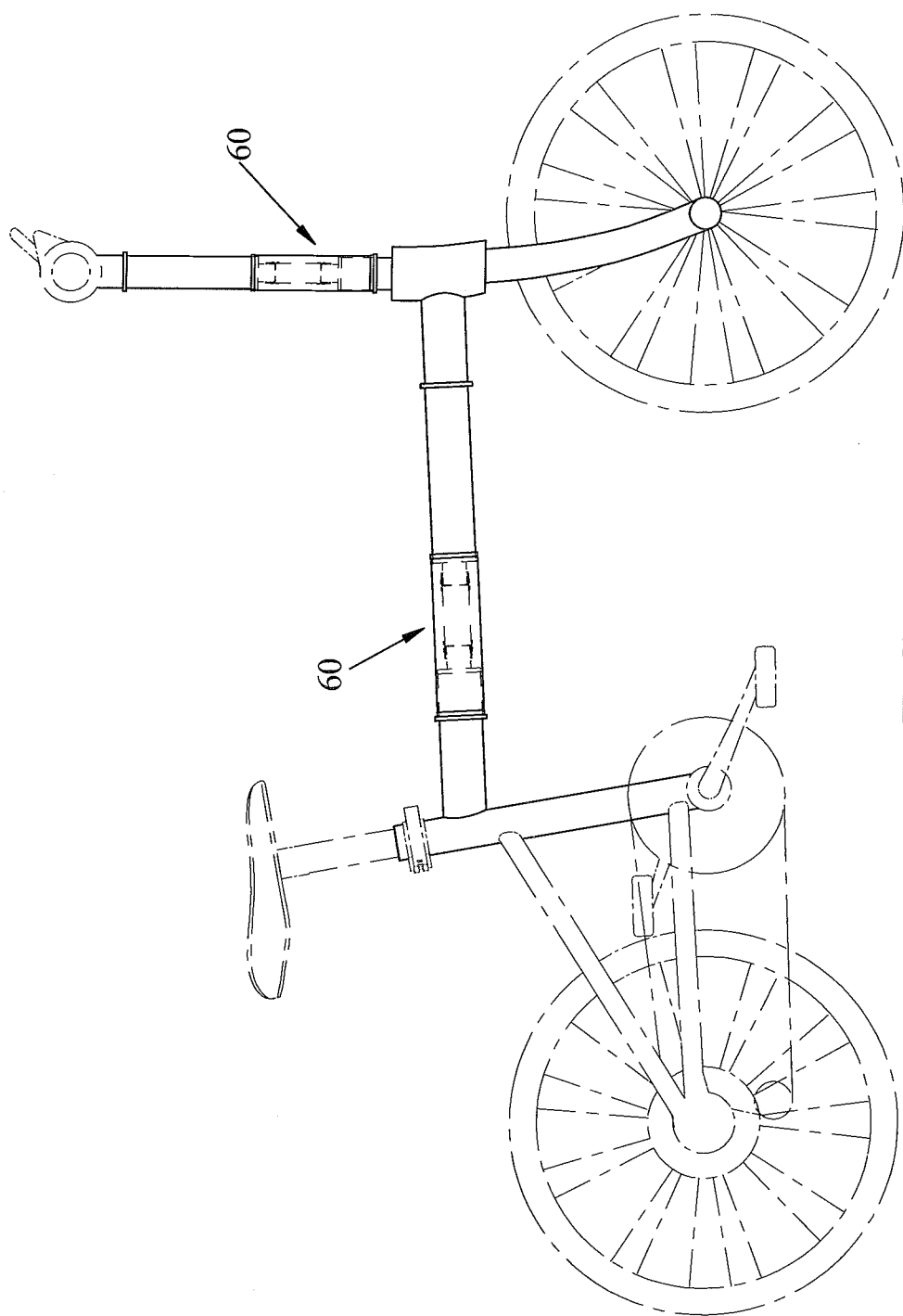
Figure 13:
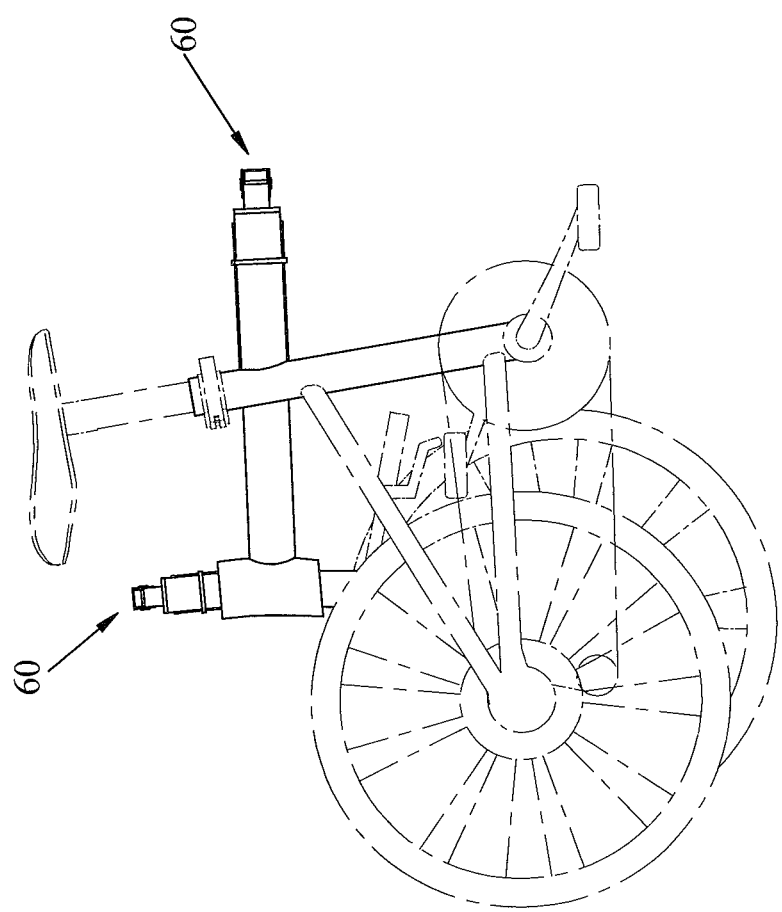
FIG. 13 shows the bicycle folded by operation of the foldable frame of the present invention.

FIGS. 12 and 13 show the foldable frame used on a foldable bicycle and including at least two two-point folding units 60. The two-point folding unit 60, as shown in FIGS. 3 and 4, includes a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to forth the two-point folding unit 60. The rectangular tube 21a has two ends thereof pivotably connected to two respective extension portions 31a, 31b of the two base parts 30a, 30b by two pins 32a as shown in FIGS. 3 and 4. An outer tube 40a is movable between the second tube 12a and the rectangular tube 21a.

Figure 14:
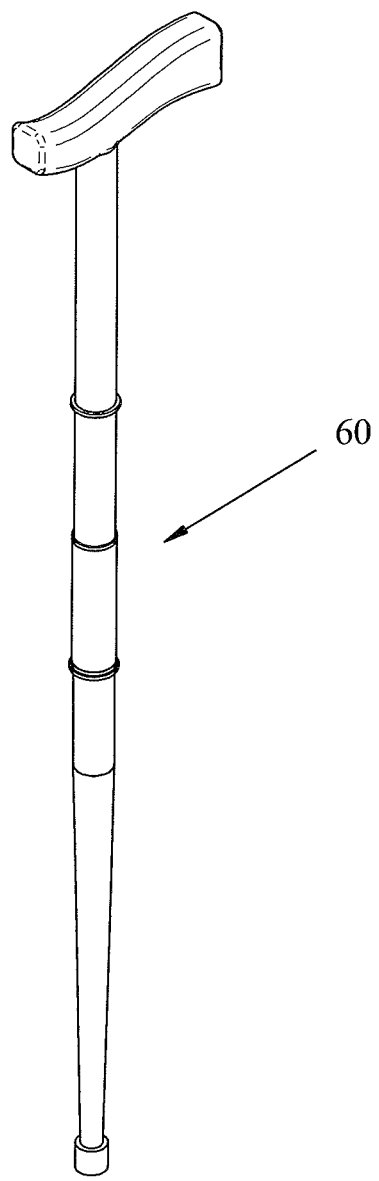
Figure 15:
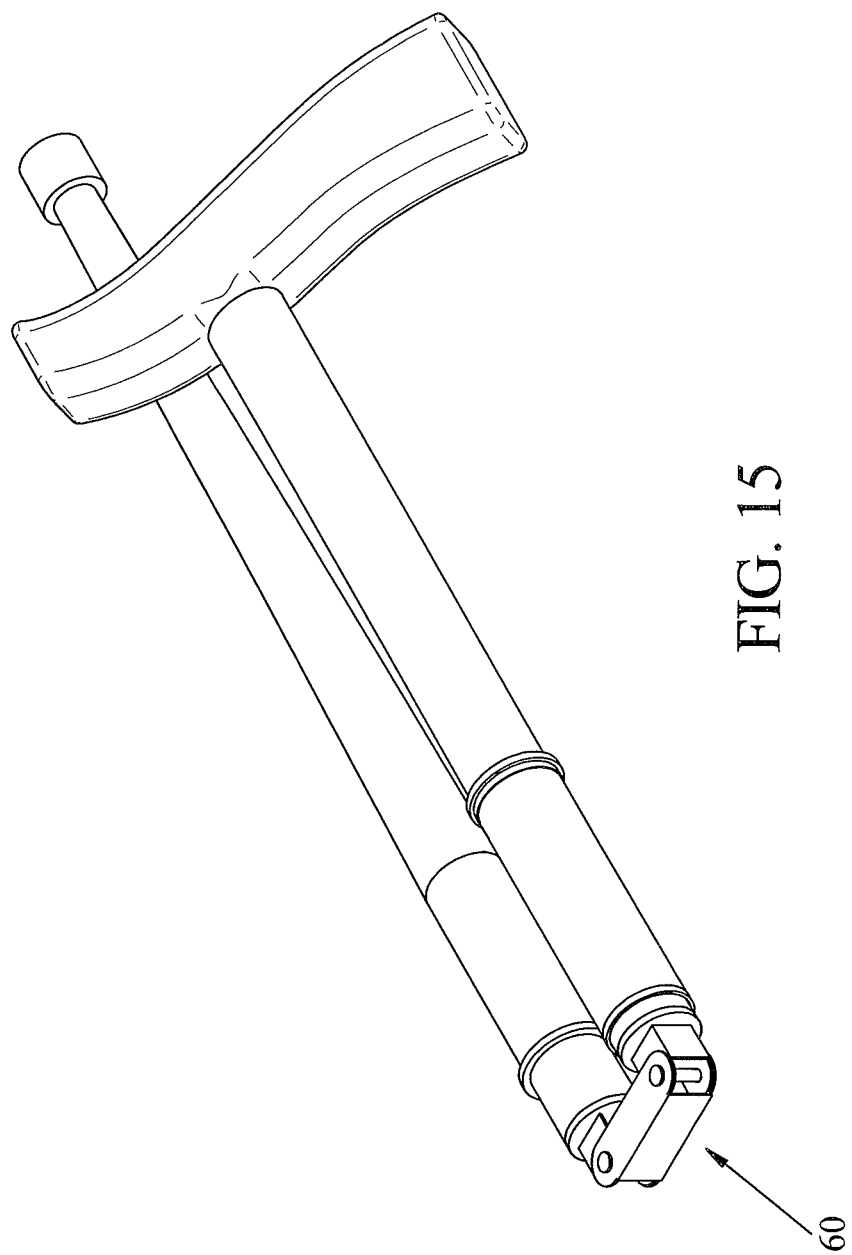
FIG. 15 shows the crutch folded by operation of the foldable frame of the present invention.

FIGS. 14 and 15 show the foldable frame used on a crutch and including at least one two-point folding unit 60. The two-point folding unit 60, as shown in FIGS. 3 and 4, includes a first tube 11a, a second tube 12a, a rectangular tube 21a and two base parts 30a, 30b. The first and second tubes 11a, 12a are pivotably or fixedly connected to the two base parts 30a, 30b by two pins 32a, so that the first and second tubes 11a, 12a are pivotable about the two pins 32a to form the two-point folding unit 60. The rectangular tube 21a has two ends thereof pivotably connected to two respective extension portions 31a, 31b of the two base parts 30a, 30b by two pins 32a as shown in FIGS. 3 and 4. An outer tube 40a is movable between the second tube 12a and the rectangular tube 21a.

It is noted that the each of the first and second tubes 11, 11a, 12, 12a and the outer tubes 40, 40a has a collar mounted to each end 93 thereof to avoid the user being injured by the sharp edges and to reinforce the structural strength of the tubes.

The outer tubes 40, 40a can be different shapes such as oval tubes, elongate tubes, and triangular tubes.

Figure 16A:
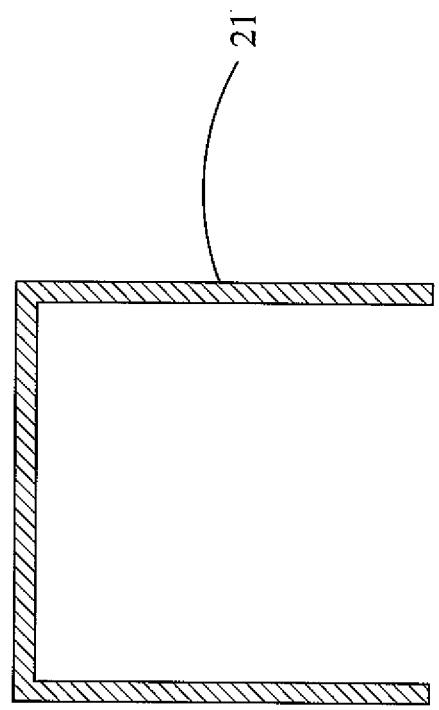
FIG. 16a shows a cross sectional view of the rectangular tube of the foldable frame of the present invention.
Figure 16B:
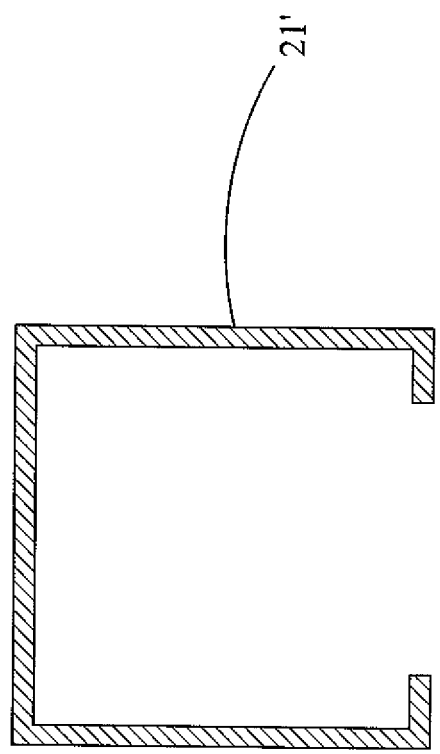
FIG. 16b shows another cross sectional view of the rectangular tube of the foldable frame of the present invention.

FIGS. 16a and 16b show that the rectangular tube 21 includes three walls and an open side, or the rectangular tube 21' includes two flanges extending inward from two parallel sides walls of the rectangular tube 21'.

Figure 17:
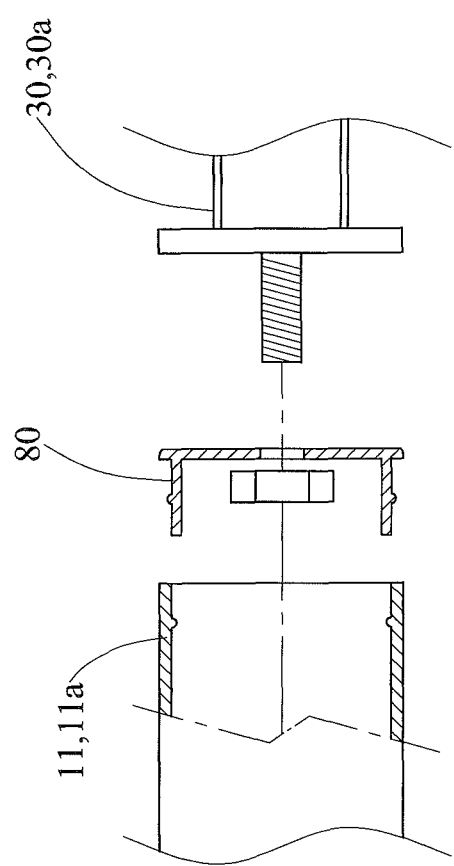
FIG. 17 is a partial cross sectional view showing the user of a connector between the base part and the tube.

FIG. 17 shows that the base part 30, 30a is connected to the connector 80 first, and the connector 80 is connected to the first tube 11, 11a.

While the embodiments in accordance with the present invention have been shown and described, it should be clear to those skilled in the art that further embodiments may be made without departing from the scope of the present invention.

What is claimed is:

1. A foldable frame comprising:
   at least one single-point folding unit having a first tube, a second tube, a rectangular tube and at least one base part, with the second tube connected to a first end of the rectangular tube and the first tube connected to the base part, with a second end of the rectangular tube pivotably connected to an extension portion of the base part by a pin, with the first tube pivotable about the pin relative to the second tube, with an outer tube movable on the second tube to extend over the rectangular tube, with a securing bolt securing the outer tube when the outer tube is moved to a position relative to the rectangular tube, and at least one two-point folding unit having a first tube, a second tube, a rectangular tube and two base parts, with the first and second tubes of the at least two-point folding unit connected to the two base parts of the at least one two-point folding unit, with the rectangular tube of the at least one two-point folding unit having two ends thereof pivotably connected to two respective extension portions of the two base parts of the at least one two-point folding unit by two pins, wherein the first and second tubes of the at least one two-point folding unit are pivotable about the two pins, wherein an outer tube is movable on the second tube between a first position located solely on the second tube and a second position extending between the first and second tubes, with the rectangular tube rotatable relative to the two respective extension portions when the outer tube of the at least one two-point folding unit is in the first position to change a folding direction, with the first and second tubes, the rectangular tube and the two respective extension portions aligned and relative rotation therebetween prevented when the outer tube of the at least one two-point folding unit is in the second position, and wherein a securing bolt secures the outer tube on the second tube of the at least one two-point folding unit.

2. The foldable frame as claimed in claim 1, wherein an inner diameter of the outer tube of the at least one two-point folding unit is a same length as a length of a rod connected to the rectangular tube parallel to and spaced from the pins of the at least one two-point folding unit.

3. The foldable frame as claimed in claim 1, wherein the foldable frame is used on a foldable bicycle.

4. The foldable frame as claimed in claim 1, wherein the foldable frame is used on a crutch.

5. The foldable frame as claimed in claim 1, wherein the at least one two-point folding unit comprises two two-point folding units, wherein the at least one single-point folding unit comprises four single-point folding units, and wherein the foldable frame further comprises two links and a fabric sheet to form a stretcher, wherein the two two-point folding units form two side rails and the two links are connected between the two side rails, wherein the fabric sheet is mounted to the two side rails and the two links, and wherein the four single-point folding units are connected to two respective undersides of the two side rails.

6. The foldable frame as claimed in claim 1, wherein the at least one two-point folding unit comprises four two-point folding units, wherein the at least one single-point folding unit comprises four single-point folding units, and wherein the foldable frame further comprises a pad to form a recliner, wherein the four two-point folding units form a rectangular frame and the pad is mounted onto the rectangular frame, and wherein the four single-point folding units are connected to an underside of the rectangular frame.

7. The foldable frame as claimed in claim 1, wherein the at least one two-point folding unit comprises at least four two-point folding units, wherein the at least one single-point folding unit comprises at least four single-point folding units, and wherein the foldable frame further comprises a desk top, wherein the at least four two-point folding units form a rectangular frame and the desk top is mounted onto the rectangular frame, and wherein the at least four single-point folding units are connected to an underside of the rectangular frame.

8. The foldable frame as claimed in claim 1, wherein each of the first and second tubes and the outer tubes has a collar mounted to each end thereof.

9. The foldable frame as claimed in claim 1, wherein each rectangular tube includes three walls and an open side.

10. The foldable frame as claimed in claim 1, wherein each rectangular tube includes two flanges extending inward from two parallel sides walls of the rectangular tube.

11. The foldable frame as claimed in claim 1, wherein the at least one base part is connected to a connector connected to the first tube of the at least one single-point folding unit.

12. The foldable frame as claimed in claim 5, wherein the two two-point folding units are parallel to each other, with one of the two links extending between the first tubes of the two two-point folding units and with another of the two links extending between the second tubes of the two two-point folding units, with the two links being spaced and parallel, with a first of the four single-point folding units connected to the first tube of one of the two two-point folding units, with a second of the four single-point folding units connected to the second tube of the one of the two two-point folding units, with a third of the four single-point folding units connected to the first tube of another of the two two-point folding units, with a fourth of the four single-point folding units connected to the second tube of the other of the two two-point folding units, with the four single-point folding units having an equal length, with each of the two links being pivotal intermediate the two two-point folding units about axes perpendicular to the two two-point folding units, with a spacing between the two two-point folding units being adjustable by pivoting the two links about the axes, with one of the first and second tubes of each of the four single-point folding units extending generally perpendicular to one of the first and second tubes of the two two-point folding units, with another of the first and second tubes of each of the four single-point folding units pivotable between a folded position relative to the one of the first and second tubes of the four single-point folding units parallel to the one of the first and second tubes of the two two-point folding units and a supporting position relative to the one of the first and second tubes extending from the one of the first and second tubes of the four single-point folding units generally perpendicular to the one of the first and second tubes of the two two-point folding units.

13. The folding frame as claimed in claim 12, wherein the first tube of each of the four single-point folding unit includes a sleeve receiving the one of the first and second tubes of the two two-point folding units for connecting thereto.

14. The folding frame as claimed in claim 13, wherein the two pins of the two two-point folding units are pivotal with the first and second tubes of the two two-point folding units being parallel to each other and with the first tubes of the two two-point folding units being parallel and with the second tubes of the two two-point folding units being parallel.

15. The folding frame as claimed in claim 14, wherein the first tube is pivotably connected to the base part about an axis perpendicular to the pin in the at least one single-point folding unit.

16. The folding frame as claimed in claim 15, wherein the first and second tubes are pivotably connected to the two base parts about axes perpendicular to the two pins in the at least one two-point folding unit.

17. The folding frame as claimed in claim 2, wherein the first and second tubes are pivotably connected to the two base parts about axes perpendicular to the two pins in the at least one two-point folding unit.

18. The folding frame as claimed in claim 1, wherein the first tube is pivotably connected to the base part about an axis perpendicular to the pin in the at least one single-point folding unit.

19. The folding frame as claimed in claim 18, wherein the first and second tubes are pivotably connected to the two base parts about axes perpendicular to the two pins in the at least one two-point folding unit.

20. The folding frame as claimed in claim 1, wherein the first and second tubes are pivotably connected to the two base parts about axes perpendicular to the two pins in the at least one two-point folding unit.

* * * * *